US012798447B2

(12) United States Patent
Rock et al.

(10) Patent No.: US 12,798,447 B2
(45) Date of Patent: Nov. 17, 2026

(54) CABLE-DEFLECTING DEVICE AND SEAT LONGITUDINAL ADJUSTMENT APPARATUS HAVING A CABLE DEFLECTING DEVICE

(71) Applicant: Adient US LLC, Plymouth, MI (US)

(72) Inventors: Arkadius Rock, Solingen (DE); Karthikeyan Maharajapuram Subramanian, Leverkusen (DE); Andrej Medved, Trencin (SK); Mark Thomas Prosch, Solingen (DE); Norbert Heeg, Dahn (DE); Stephan Witte, Essen (DE); Kirubaharan Albert Reginold, Burscheid (DE)

(73) Assignee: Adient US LLC, Plymouth, MI (US)

( * ) Notice: Subject to any disclaimer, the term of this patent is extended or adjusted under 35 U.S.C. 154(b) by 210 days.

(21) Appl. No.: 18/716,178

(22) PCT Filed: Dec. 7, 2022

(86) PCT No.: PCT/IB2022/061866
§ 371 (c)(1),
(2) Date: Jun. 4, 2024

(87) PCT Pub. No.: WO2023/105428
PCT Pub. Date: Jun. 15, 2023

(65) Prior Publication Data

US 2025/0018838 A1 Jan. 16, 2025

(30) Foreign Application Priority Data

Dec. 7, 2021 (DE) ..................... 10 2021 213 922.1
Apr. 6, 2022 (DE) ..................... 10 2022 203 439.2

(51) Int. Cl.
*B60N 2/06* (2006.01)

(52) U.S. Cl.
CPC .................................... *B60N 2/06* (2013.01)

(58) Field of Classification Search
CPC ..... B60N 2/06; B60R 16/027; B60R 16/0215; H02G 11/006
See application file for complete search history.

(56) References Cited

U.S. PATENT DOCUMENTS 2,799,186 A * 7/1957 Sickmann ............ H02G 11/006 408/241 R
7,252,541 B2 * 8/2007 Tsubaki ............... B60N 2/0264 174/72 A (Continued)

FOREIGN PATENT DOCUMENTS

CN 111071217 A 4/2020
DE 20305536 U1 9/2003

(Continued)

OTHER PUBLICATIONS

European Patent Office, International Search Report and Written Opinion in Application No. PCT/IB2022/061866, dated Feb. 24, 2023, 11 pages, Rijswijk, Netherlands.

(Continued)

*Primary Examiner* — Eret C Mcnichols
(74) *Attorney, Agent, or Firm* — Marshall & Melhorn LLC

(57) ABSTRACT

A cable cassette for a seat longitudinal adjustment apparatus may have at least a housing and two rotatably mounted deflecting rollers. One of the deflecting rollers may be held such that it is guided for longitudinal movement in the housing relative to the other, stationary deflecting roller. A first free end of the connecting cable of the cable bundle is held in a fixed position via a first cassette outlet and the connecting cable or the cable bundle is guided and deflected around the movable deflecting roller and led from the movable deflecting roller to the other, stationary deflecting roller and is deflected around said stationary deflecting roller. A second free end of the connecting cable or of the (Continued)

cable bundle is movably mounted. A seat longitudinal adjustment apparatus may have the cable cassette.

13 Claims, 7 Drawing Sheets

(56) References Cited

U.S. PATENT DOCUMENTS

| | | | | |
|---|---|---|---|---|
| 7,402,044 | B2 * | 7/2008 | Terada | H02G 11/00 174/72 A |
| 7,814,637 | B2 * | 10/2010 | Terada | B60R 16/0215 29/748 |
| 9,308,833 | B2 * | 4/2016 | Sekino | B60N 2/071 |
| 9,670,708 | B2 * | 6/2017 | Tsubaki | E05F 15/646 |
| 9,787,076 | B2 * | 10/2017 | Li | H05K 7/02 |
| 10,214,168 | B1 * | 2/2019 | Yamamoto | B60R 22/26 |
| 10,315,594 | B2 * | 6/2019 | Yamamoto | B60R 16/03 |
| 10,384,624 | B2 * | 8/2019 | Kato | B60R 16/0215 |
| 11,128,112 | B2 * | 9/2021 | Yamamoto | B60N 2/0715 |
| 11,203,308 | B2 * | 12/2021 | Yamamoto | B60N 2/0722 |
| 11,639,119 | B2 * | 5/2023 | Kim | B60N 2/0725 248/429 |
| 11,975,662 | B2 * | 5/2024 | Yamamoto | B60R 16/027 |
| 2003/0119338 | A1 * | 6/2003 | Bigotto | B60R 16/027 439/34 |
| 2009/0020331 | A1 * | 1/2009 | Tsubaki | B60R 16/0207 174/72 A |
| 2009/0035953 | A1 * | 2/2009 | Tsubaki | H02G 11/006 439/34 |
| 2012/0024564 | A1 * | 2/2012 | Sekino | B60N 2/0715 174/68.3 |
| 2014/0339376 | A1 * | 11/2014 | Katou | B60R 16/027 248/49 |
| 2015/0360629 | A1 * | 12/2015 | Sekino | B60R 16/037 174/68.3 |
| 2016/0257268 | A1 * | 9/2016 | Tsubaki | E05F 15/646 |
| 2018/0278036 | A1 * | 9/2018 | Kuboki | B60R 16/0215 |
| 2018/0361960 | A1 * | 12/2018 | Yamamoto | B60R 16/0215 |
| 2019/0054868 | A1 * | 2/2019 | Yamamoto | B60N 2/06 |
| 2024/0067053 | A1 * | 2/2024 | Gropp | B60R 16/0215 |

FOREIGN PATENT DOCUMENTS

| | | | | | |
|---|---|---|---|---|---|
| EP | 1783875 | A1 | * | 5/2007 | H02G 11/006 |
| EP | 2813455 | A1 | | 12/2014 | |
| JP | H0723826 | A | | 9/1995 | |
| JP | 2003312385 | A | | 11/2003 | |
| JP | 2020145027 | A | * | 9/2020 | B60R 16/027 |
| JP | 2022152941 | A | * | 10/2022 | |
| WO | WO-2006013885 | A1 | * | 2/2006 | B60R 16/0215 |
| WO | 2020179176 | A1 | | 9/2020 | |

OTHER PUBLICATIONS

China National Intellectual Property Administration, Office Action in application No. 202280080703.2, dated Aug. 28, 2026, 18 pages, with English translation of pp. 3-7.

* cited by examiner

CABLE-DEFLECTING DEVICE AND SEAT LONGITUDINAL ADJUSTMENT APPARATUS HAVING A CABLE DEFLECTING DEVICE

FIELD

The invention relates to a cable deflecting apparatus, in particular a cable cassette, for a seat longitudinal adjustment device of a seat, in particular vehicle seat. The invention also relates to a seat longitudinal adjustment device for a seat, in particular vehicle seat, having such a cable deflecting apparatus.

BACKGROUND

A seat longitudinal adjustment device for at least one vehicle seat in a vehicle generally comprises two rail pairs which are arranged at a spacing from one is another and are each formed from two rails, specifically an upper rail assigned to the seat and a lower rail assigned to the floor of the vehicle. The seat longitudinal adjustment device is, for example, electrically adjustable. For this, the seat longitudinal adjustment device comprises, for example, an adjustment unit and a drive unit for electrically driving the adjustment unit, power being supplied to the drive unit via at least one connecting cable. If the adjustment travel is long, it must be ensured that the connecting cable can be carried along through a rail profile reliably in terms of operation. Furthermore, for longer adjustment travels, it is also necessary to use a correspondingly long connecting cable, which must be protected against external influences.

Furthermore, for example, the use of sliding contacts in rail profiles is known from the prior art. Power is supplied to a rail runner of a rail pair via the sliding contacts.

Cable coiling apparatuses, what are referred to as cable coilers or cable drawing-in systems, with a cable being coiled up around a roll body, are known from the prior art. The cable is coiled in the form of a spiral.

An object of the present invention is to specify a cable deflecting apparatus, in particular cable cassette, for a seat longitudinal adjustment device, which cable deflecting apparatus is improved in relation to the prior art and enables relatively low-friction and wear-free guidance and space-saving placement of a connecting cable, cable bundle or cable housing. Another object of the present invention is to specify a seat longitudinal adjustment device for a seat, in particular a vehicle seat, which seat longitudinal adjustment device is improved in relation to the prior art.

In terms of the cable deflecting apparatus, in particular cable cassette, and in terms of the seat longitudinal adjustment device, the objects are achieved according to the invention by the features of the claims described herein.

SUMMARY

The cable deflecting apparatus, in particular cable cassette, according to the invention for a seat longitudinal adjustment device of a seat, in particular vehicle seat, comprises at least one housing and two rotatably mounted deflecting rollers, which are arranged in the housing and have a respective deflection region for deflecting, in particular for guiding, a connecting cable or cable bundle or cable housing, one of the deflecting rollers being held so as to be longitudinally movably guided in the housing relative to the other, stationary, in particular positionally fixed, deflecting roller. A first free end of the connecting cable or cable bundle is held fixed in position via a first cassette outlet. The connecting cable or cable bundle is guided and deflected around the movable deflecting roller and guided from the movable deflecting roller to the other, stationary deflecting roller and deflected around this stationary deflecting roller. A second free end of the connecting cable or cable bundle is movably mounted. For example, the second free end is led out of a second cassette outlet and is insertable or inserted in a rail pair.

In the following text, connecting cable is understood to mean any possible cable arrangement, for example of one cable or multiple cables, for example a cable bundle or a cable housing having a number or plurality of cables.

The advantages afforded by the invention consist in particular in a cable length of the connecting cable, which is arranged for example partially in the rail profile of a rail pair and partially in the cable deflecting apparatus, in particular cable cassette, being automatically adapted to an adjustment travel, in particular long adjustment travel. This prevents some of the connecting cable being slack in the rail profile and/or in the cable deflecting apparatus, in particular cable cassette. In addition, it prevents the connecting is cable from rattling or twisting in the rail profile. The deflecting rollers can be used to hold the connecting cable under tension when the seat longitudinal adjustment device is in operation and when it is not in operation. Furthermore, the connecting cable is prevented from unintentionally rubbing against other components of the rail pair during a seat longitudinal adjustment.

Another advantage consists in the connecting cable being securely guided and held in the rail profile and in the cable deflecting apparatus and exposed to less vibrations as a result. This substantially avoids the connecting cable or the cable arrangement suffering a cable break.

The cable deflecting apparatus has a reduced number of parts and saves on space. By means of the cable deflecting apparatus, the connecting cable is held so as to be completely guided with, for example, a single cable loop. This makes it possible to achieve a narrow and flat design of the cable deflecting apparatus in comparison with conventional cable drum arrangements, in which the cable is coiled around a winding drum.

In comparison with conventional cable drum arrangements, the connecting cable does not need to be coiled around and uncoiled from a winding drum or multiple winding drums, as a result of which less space, in particular structural space, is required.

The cable deflecting apparatus, in particular cable cassette, comprises for example a partially open or closed housing. The housing has at least two walls, which have through-openings for the passage of the connecting cable. One end of the connecting cable is connected to a power source, for example a vehicle power source. Another end of the connecting cable is connected to a movable rail, in particular to an adjustment unit. Inside the is housing, the connecting cable is protected against external influences. The through-openings form the cassette outlets. The first cassette outlet is formed, for example, on the bottom of the housing, in particular in the housing bottom. The second cassette outlet is formed, for example, on the side of the housing, for example on a longitudinal side of the cable cassette. The first cassette outlet and the second cassette outlet may be arranged at the same cassette end and/or on the same cassette side.

In another embodiment, a plurality of through-openings, in particular cassette outlets, is formed on the housing. Different cassette outlets can be used depending on an available connecting cable or cable bundle and to adjust various variable cable lengths. As a result, the cable cassette is usable for different connecting cables and cable lengths.

The cable deflecting apparatus can be positioned over the entire length of, and fastened to, the rail pair. The cable deflecting apparatus, for example in the form of a cable cassette, is constructed such that, irrespective of its alignment, the cable deflecting apparatus is mountable on a side of the rail pair or on a vehicle floor.

For example, one rail of the rail pair is a lower rail secured to the vehicle, also referred to as bottom rail, and another rail of the rail pair is an upper rail, also referred to as rail runner or seat rail. The movable upper rail is relatively movable in relation to the lower rail. The rail runner is coupled, for example, to a seat, in particular vehicle seat. For example safety components, such as airbags, actuatable seatbelt tighteners and/or seatbelt reminders or other safety-relevant functional components, are arranged in and/or on the seat. The cable cassette ensures provision of a necessary cable length and power supply to the seat irrespective of an adjustment and/or position of the seat or of the movable upper rail along the lower rail.

In another embodiment, the deflecting rollers are at least partially provided with a wear-resistant and/or low-friction coating and/or flocking.

In another embodiment, the housing has a roller guide in which the movable deflecting roller is guidedly held. The roller guide is, for example, a guide groove or a guide channel. The movable deflecting roller has a bearing element, which is guidedly held in the roller guide. The bearing element is, for example, a bearing bolt or a bearing pin. In a refinement, the movable deflecting roller is held in the roller guide by means of a rail guide. For example, the bearing element is provided with a rail element. For example, the bearing element is provided with a roller holder, which is arranged or arrangeable displaceably in the roller guide. The deflecting roller for assisting a cable movement is mounted rotatably about the bearing element. The bearing element provides an axis of rotation. By means of the thus rotatably mounted deflecting roller and the smoother running thus achieved, the connecting cable is prevented from becoming wedged during a movement and adjustment. In a refinement, the deflecting roller comprises a ball bearing for stable concentricity. A rotary cylinder can also be used as deflecting roller. In particular, the deflecting roller is in the form of a rolling element which deflects the connecting cable or cable bundle.

In another embodiment, the housing at one housing end has a bearing element, on which the other deflecting roller is held fixed in position. This deflecting roller is also referred to as positionally fixed deflecting roller below. The movable deflecting roller is axially movable for example relative to the positionally fixed, stationary but rotary or rotatable deflecting roller. The bearing element is, for example, a bearing bolt connected to the housing or a bearing pin. The bearing element is fixed, for example fastened by a material bond, a force-fit and/or a form-fit, for example to the housing end. The deflecting roller for assisting a cable movement is mounted rotatably about the bearing element. The bearing element provides an axis of rotation. By means of the thus rotatably mounted deflecting roller and the smoother running thus achieved, the connecting cable is prevented from becoming wedged during a movement and adjustment. In a refinement, the deflecting roller comprises a ball bearing for stable concentricity. A rotary cylinder can also be used as deflecting roller. In particular, the deflecting roller is in the form of a rolling element which deflects the connecting cable or cable bundle.

In another embodiment, at least one spring element is provided in the housing, the movable deflecting roller being held in the housing under bias by means of the spring element. By modifying a spacing between the deflecting rollers, a required and utilized cable length of the connecting cable in the rail profile can be lengthened or shortened. The connecting cable is held in a deflected state on the deflecting rollers. The connecting cable is guidedly held in particular in the predefined deflection regions. The deflected cable portions of the connecting cable are held under tension in any position of the movable deflecting roller in relation to the positionally fixed deflecting roller. Depending on a required cable length of the connecting cable, for example for a comparatively long seat longitudinal adjustment device, for example over multiple seat rows, a number of the deflection regions in the housing is variable.

When the seat longitudinal adjustment device is in operation and also when it is not in operation, the cable deflecting apparatus can be used to adjust the cable length such that the connecting cable, cable bundle or cable housing are prevented from being slack in the cable deflecting apparatus and in the rail profile. Disruptive excess cable lengths are also avoided. Cable management is improved by means of the cable deflecting apparatus.

In another embodiment, the spring element is fastened to a housing end of the housing. For example, one spring end of the spring element is connected to the movable deflecting roller. Another spring end is connected to the housing end. The spring element is, for example, a tension spring. In the initial state of the spring element, the movable deflecting roller is moved, in particular biased, toward the corresponding housing end. The positionally fixed deflecting roller is arranged at the oppositely situated housing end. To move the movable deflecting roller toward the positionally fixed deflecting roller, action is exerted counter to the spring force of the spring element.

In another embodiment, the spring element is in the form of a roller spring. The spring element in the form of a roller spring is coilable around a winding roller. The winding roller is fastened, for example, to the housing end of the housing. One spring end of the spring element is fastened to the winding roller and another spring end of the spring element is connected to the movable deflecting roller. In the initial state of the spring element, the movable deflecting roller is moved, in particular biased, toward the corresponding housing end. The positionally fixed deflecting roller is arranged at the oppositely situated housing end. To move the movable deflecting roller toward the positionally fixed deflecting roller, action is exerted counter to the spring force of the spring element.

In particular, the cable cassette comprises a plurality of spring elements. For example, the cable cassette comprises two, three, four or multiple spring elements. The spring elements may each be in the form of a roller spring. It is also possible to use other spring elements or a combination of different spring elements. The spring elements can each be connected to the movable deflecting roller. The spring elements may be arranged at the same housing end. Two respective spring elements may be arranged parallel to one another and/or next to one another in this case. The connecting cable or cable bundle may be laid over the two deflecting rollers substantially in an S shape. The connecting cable or cable bundle may both be inserted in the housing and led out for connection to the seat longitudinal adjustment device is at the same housing end. The spring element or the spring elements may be arranged at a housing end opposite the housing end intended for insertion and leading-out of the connecting cable or cable bundle. The movable deflecting roller may be connected to the spring element or the spring elements via a roller holder. In an end position of the movable deflecting roller, the roller holder and/or the deflecting roller and at least one of the spring elements may be arranged next to one another. The roller holder may be in the form of a carriage. The roller holder may be guidedly held in the roller guide. The spring element or the spring elements may apply a sufficient force to the roller holder and the movable deflecting roller. The use of a roller spring or multiple roller springs makes it possible to save on space. The cable cassette can in particular have a compact design. When multiple roller springs are used, they can be arranged relatively close to one another. In addition, this makes it possible to provide a uniform force deployment over the entire adjustment travel.

In another embodiment according to the invention, the housing comprises a deflecting guide, which forms a further deflection region for deflecting the connecting cable or the cable bundle or the cable housing. The deflecting guide may be in the form of a further deflecting roller. The deflecting guide may be designed in the form of a semicircle and/or be C shaped or U shaped. For example, the deflecting guide is arranged in the region of a housing end of the housing situated opposite the housing end with the positionally fixed deflecting roller.

In another embodiment, the movable deflecting roller is arranged so as to be movably guided between the deflecting guide and the positionally fixed deflecting roller. The spring element for biasing the movable deflecting roller may be fastened to the deflecting guide by way of one spring end and to the movable deflecting roller by way of another spring end. The deflecting guide is connected to the housing by a material bond, a force-fit and/or a form-fit and is positionally fixed, in particular positionally secured, for example immovable. The deflecting guide is, for example, a sliding-guidance element.

The object is also achieved according to the invention by a seat longitudinal adjustment device for a seat, in particular a vehicle seat, the seat longitudinal adjustment device comprising at least a rail pair having at least two rails that are movable relative to one another, a for example electrically operable or a manually actuatable adjustment unit and a cable deflecting apparatus, a connecting cable or cable bundle or cable housing, which connects the adjustment unit and/or the rail pair and/or the seat to a power supply unit, being arranged, in particular guidedly held, partially in the cable deflecting apparatus and partially in a rail profile of the rail pair, the cable deflecting apparatus comprising at least two deflecting rollers, which are designed to be moved relative to one another depending on an adjustment of the rails of the rail pair in order to modify a cable length of the connecting cable, in particular inside the rail profile and/or the cable deflecting apparatus.

The cable deflecting apparatus is, for example, in the form of a cable cassette and/or winding apparatus and/or coiling apparatus and/or drum arrangement. In an alternative embodiment, the cable deflecting apparatus comprises, for example, a winding drum, around which the connecting cable, cable bundle or cable housing can be wound up or coiled. For example, the winding drum is arranged at a housing end of the housing.

According to the invention, the connecting cable is partially deflected at the deflecting rollers. As an alternative or optional addition, the connecting cable may be coiled and uncoiled respectively on the deflecting rollers.

The advantages afforded by the invention consist in particular in the cable length of the connecting cable, which is arranged partially in the rail profile of is the rail pair and partially in the cable deflecting apparatus, being automatically adapted to an adjustment travel, in particular long adjustment travel. This avoids some of the connecting cable being slack in the rail profile and/or in the cable deflecting apparatus. In addition, it prevents the connecting cable from rattling or twisting in the rail profile. The deflecting rollers can be used to hold the connecting cable under tension when the seat longitudinal adjustment device is in operation and when it is not in operation.

Furthermore, the connecting cable is prevented from unintentionally rubbing against other components of the rail pair during a seat longitudinal adjustment.

Another advantage consists in the connecting cable being securely guided and held in the rail profile and in the cable deflecting apparatus and exposed to less vibrations as a result. This substantially avoids the connecting cable or the cable arrangement suffering a cable break.

In another embodiment, the connecting cable is provided with a wear-resistant and/or low-friction coating and/or flocking.

In another embodiment, the seat longitudinal adjustment device according to the invention comprises at least two rail pairs arranged at a spacing from one another, the rail pairs each being formed from an upper rail and a lower rail, which are movable relative to one another. The upper rail is in the form of an in particular movable rail element. The cable deflecting apparatus is arranged parallel to the longitudinal direction of the rail pair, for example arranged at the side of the rail pair in the transverse direction. The cable cassette extends parallel to the longitudinal direction of the rail pair. A housing side of the cable deflecting apparatus can be connected to a side of the rail pair, in particular to the lower rail of the rail pair.

Depending on the type of design of the seat longitudinal adjustment device, alternatively the upper rail can have a fixed form and the lower rail can be in the form of the rail element that was movable before. In this case, the upper rail, also referred to as rail runner, has a significantly shorter length than the lower rail, also referred to as guide rail. For example, the in particular fixed lower rail has a length of a few meters, in particular of 1.5 m to 2.5 m, for example of 2 m. The upper rail or the rail runner has a short length of less than 1 m.

In another embodiment, the seat longitudinal adjustment device for longitudinally adjusting the seat comprises, for example, rolling elements and/or slide rollers or slide cylinders, which are mounted on the upper rail and roll on the lower rail. The rolling elements are, for example, constituent parts of the adjustment unit. The rolling elements are, for example, electrically drivable, in particular movable. For example, the lower rail has a number of rolling surfaces, for example contact surfaces, for the adjustment elements of the adjustment unit that are in the form of rolling elements. The adjustment elements are arranged on the movable upper rail and hold the upper rail movably on the lower rail.

For example, the upper rail comprises lower adjustment elements, in particular main support rollers or main support rolls, slide rollers or slide cylinders, and upper adjustment elements, for example secondary rollers, in particular auxiliary support rollers or auxiliary support rolls, slide rollers or slide cylinders.

DESCRIPTION OF THE FIGURES

Exemplary embodiments of the invention will be discussed in more detail with reference to drawings, in which.

DETAILED DESCRIPTION

Parts which correspond to one another are denoted by the same reference signs in all the figures.

Figure 1:
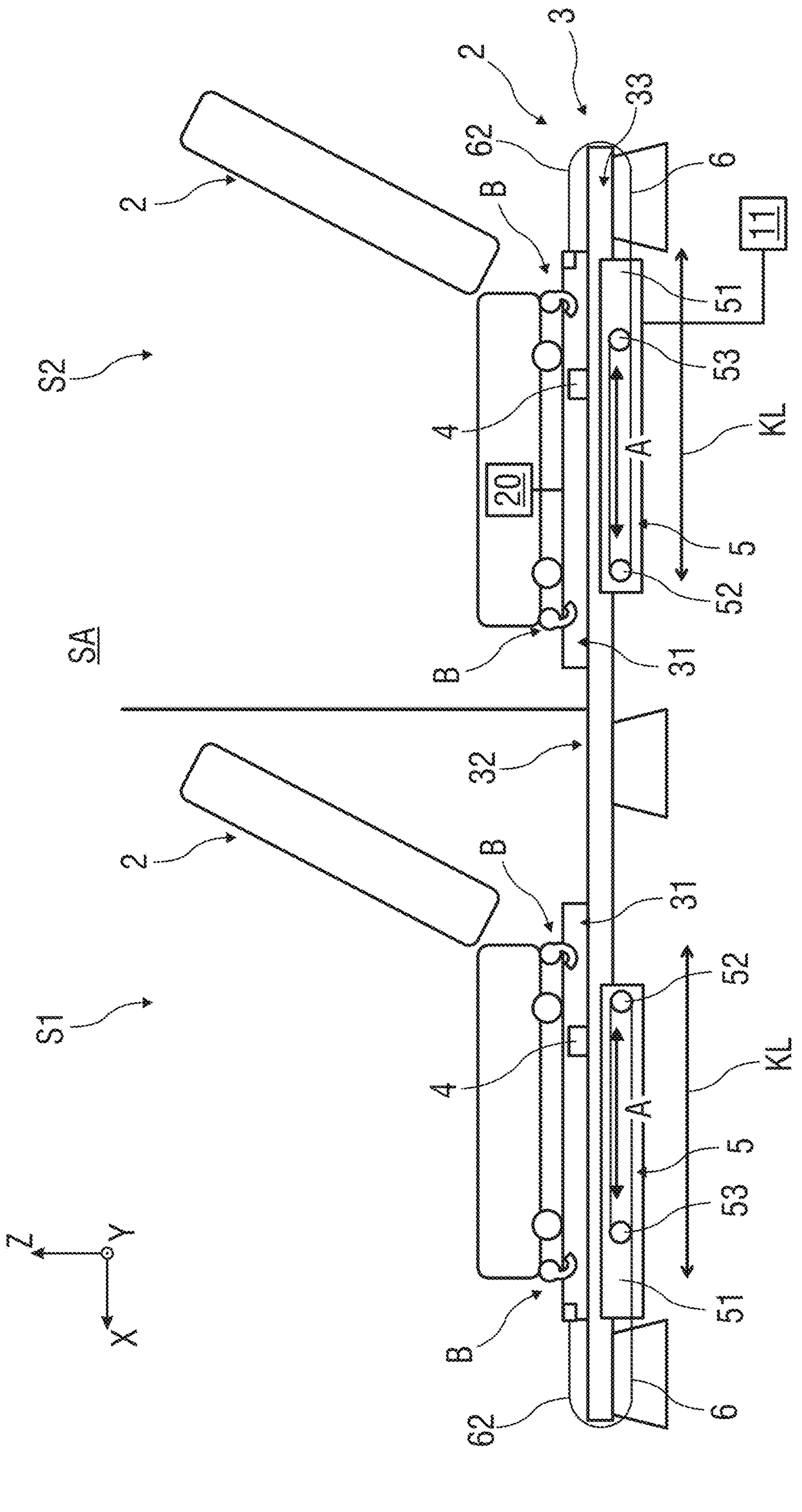
FIG. 1 schematically shows a side view of a seat arrangement with at least two seat rows arranged one behind the other and at least one seat longitudinal adjustment device, which comprises at least one lower rail and two upper rails, FIG. 2 schematically shows a plan view of a number of components of a seat longitudinal adjustment device, FIG. 3 schematically shows a perspective view of one embodiment of a cable deflecting apparatus for a seat longitudinal adjustment device, FIG. 4 schematically shows a perspective view of another embodiment of a cable deflecting apparatus for a seat longitudinal adjustment device, FIG. 5 schematically shows a perspective view of another embodiment of a cable deflecting apparatus for a seat longitudinal adjustment device, FIG. 6 schematically shows a sectional illustration through a rail pair of the seat longitudinal adjustment device, and FIG. 7 schematically shows a perspective view of another embodiment of a cable deflecting apparatus for a seat longitudinal adjustment device.

FIG. 1 schematically shows a side view of a seat arrangement SA with at least two seat rows S1, S2 arranged one behind the other and at least one seat longitudinal adjustment device 1.

Two vehicle seats 2, which are arranged so as to be longitudinally displaceable in a vehicle, not illustrated in more detail, by means of the seat longitudinal adjustment device 1 are illustrated.

The vehicle seats 2 schematically illustrated in FIG. 1 are described below using three spatial directions which extend perpendicularly in relation to one another. In the case of a vehicle seat 2 installed in the vehicle, a longitudinal direction X extends largely horizontally and preferably parallel to a vehicle longitudinal direction, which corresponds to the normal direction of travel of the vehicle. A transverse direction Y which extends perpendicularly in relation to the longitudinal direction X is likewise oriented horizontally in the vehicle and runs parallel to a vehicle transverse direction. A vertical direction Z extends perpendicularly in relation to the longitudinal direction X and perpendicularly in relation to the transverse direction Y. In the case of a vehicle seat 2 installed in the vehicle, the vertical direction Z preferably extends parallel to a vehicle vertical axis.

The positional and directional indications used, such as for example front, rear, top and bottom, relate to a viewing direction of an occupant seated in the vehicle seat 2 in a normal sitting position, the vehicle seat 2 being installed in the vehicle, in a use position suitable for passenger transport, with an upright backrest, and being oriented, as is customary, in the direction of travel. The vehicle seat 2 may, however, also be installed or moved in a different orientation, for example transversely to the direction of travel.

The seat longitudinal adjustment device 1 comprises two rail pairs 3, which are arranged at a spacing from one another, only one rail pair 3 being shown. The respective rail pair 3 comprises at least two rails 31, 32, which are movable relative to one another. For example, the respective rail pair 3 comprises a rail 31 in the form of a seat rail and a rail 32 in the form of a bottom rail. The rail 32 is, for example, a lower rail, also referred to as guide is rail. The rail 31 is, for example, an upper rail, also referred to as rail runner. For the sake of better understanding of the rest of the description, the rail 31 is always the upper rail 31 and the rail 32 is always the lower rail 32.

In the exemplary embodiment illustrated, the respective rail pair 3 comprises a lower rail 32 and two upper rails 31, the upper rails 31 being assigned to a respective one of the vehicle seats 2. The lower rail 32 is, for example, in the form of a long track.

The respective upper rail 31 and the vehicle seat 2 assigned to it are detachably connected to one another via seat attachment elements B, for example latching hooks.

The upper rails 31 are each arranged on the lower rail 32 so as to be longitudinally adjustable between a front end position and a rear end position. This adjustability permits a longitudinal adjustment of the position of the vehicle seat 2, with the frontmost position of the vehicle seat 2 being assigned to the front end position of the respective upper rail 31 and the rearmost position of the vehicle seat 2 being assigned to the rear end position of the respective upper rail 31.

The seat longitudinal adjustment device 1 comprises, for example, a locking element, which is not illustrated in more detail. In this case, each rail pair 3 can comprise an associated locking element.

The seat longitudinal adjustment device 1 comprises at least one adjustment unit 4 for longitudinal adjustment of the seat 2. As an alternative, the adjustment unit 4 is manually actuatable. The longitudinal adjustment of the seat 2 can be done, for example, manually.

In a refinement, the seat 2 is provided, for example, with a number of safety components 20. Safety components 20 are, for example, airbags, seatbelt tighteners, for example pyrotechnically drivable seatbelt tighteners, and/or seatbelt reminders.

Furthermore, the seat longitudinal adjustment device 1 comprises two cable deflecting apparatuses 5, with a cable deflecting apparatus 5, in particular a cable cassette 5, being assigned to a respective upper rail 31. The respective cable deflecting apparatus 5 is arranged on one side of the rail pair 3. In particular, the respective cable deflecting apparatus 5 is fastened to the lower rail 32. For example, the respective cable deflecting apparatus 5 is connected to the lower rail 32 by a material bond, force-fit and/or form-fit.

A connecting cable 6 is provided, which connects the adjustment unit 4 and/or the upper rail 31 and/or the vehicle seat 2, in particular the safety components 20, to a supply unit 11, in particular power supply unit or power source, for example an electrical system of the vehicle or another power supply unit, for example a battery. Power is thus supplied to the seat longitudinal adjustment device 1 via the connecting cable 6.

The connecting cable 6 is arranged, in particular guidedly held, partially in the cable deflecting apparatus 5 and partially in a rail profile 33 of the rail pair 3.

The cable deflecting apparatus 5 comprises a housing 51 and two deflecting rollers 52, 53, which are arranged in the housing 51 and are designed to be moved relative to one another depending on an adjustment of the rails 31, 32 relative to one another, in particular in the event of adjustment of the upper rail 31 relative to the lower rail 32, in order to modify, in particular adapt, a cable length KL of the connecting cable 6.

Figure 3:
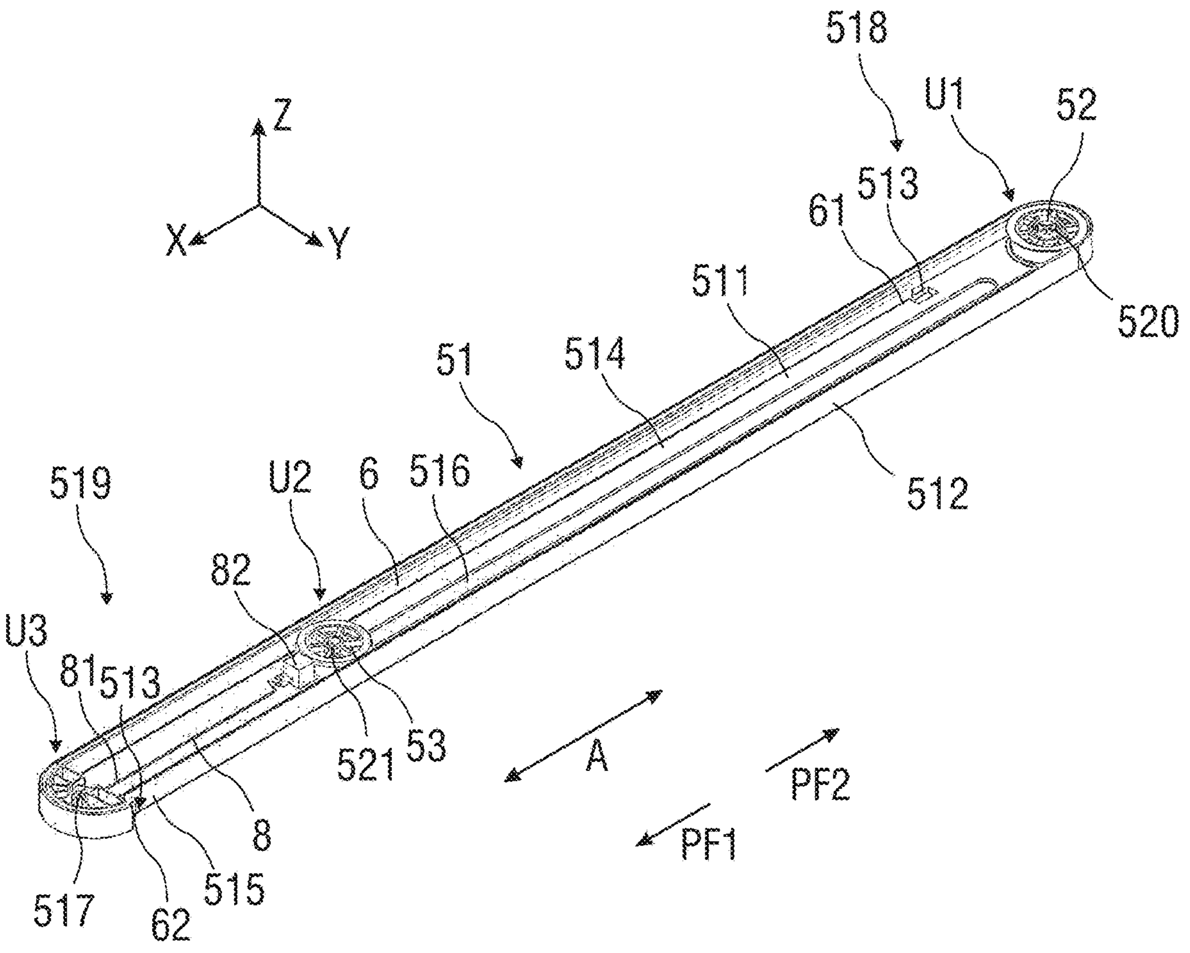
Figure 4:
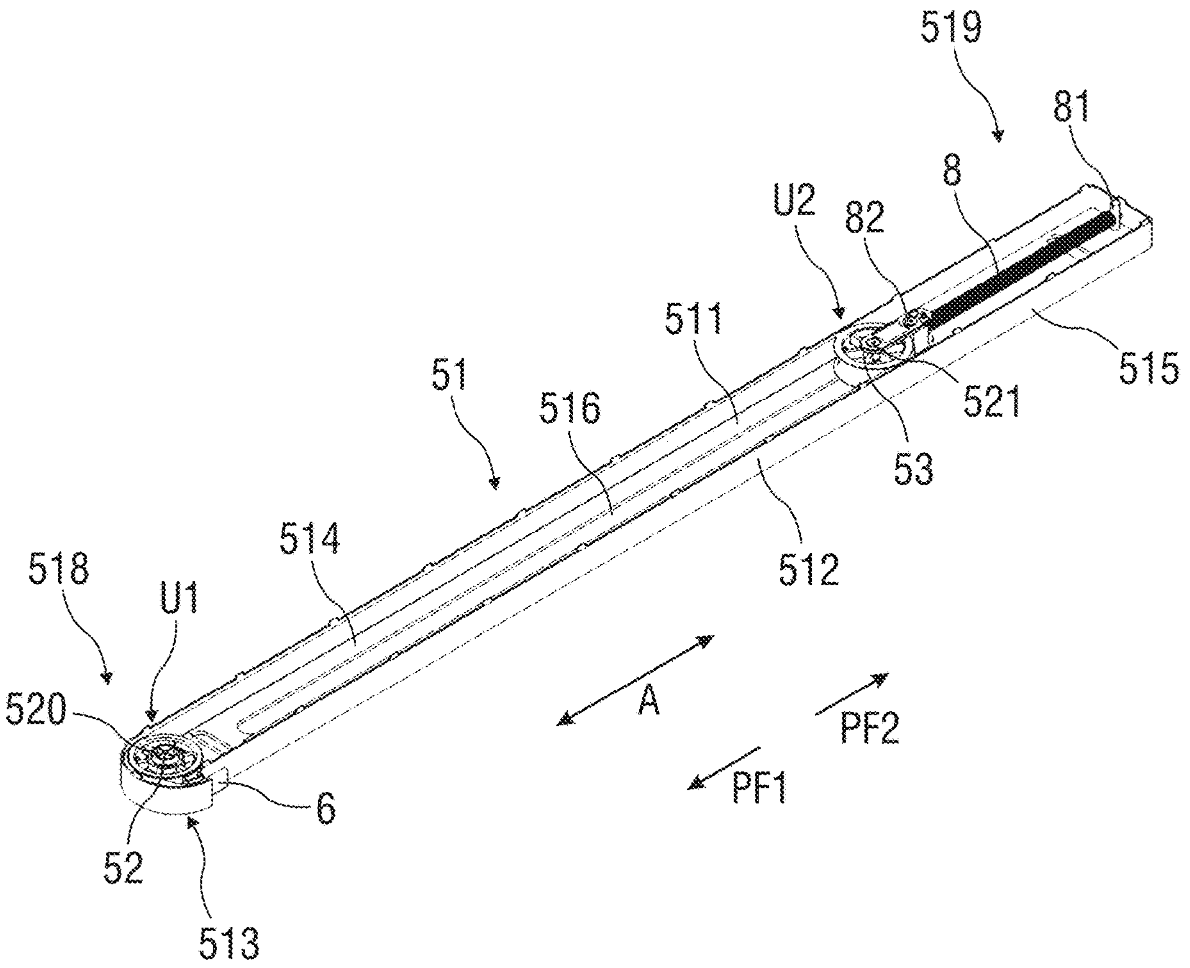
Figure 5:
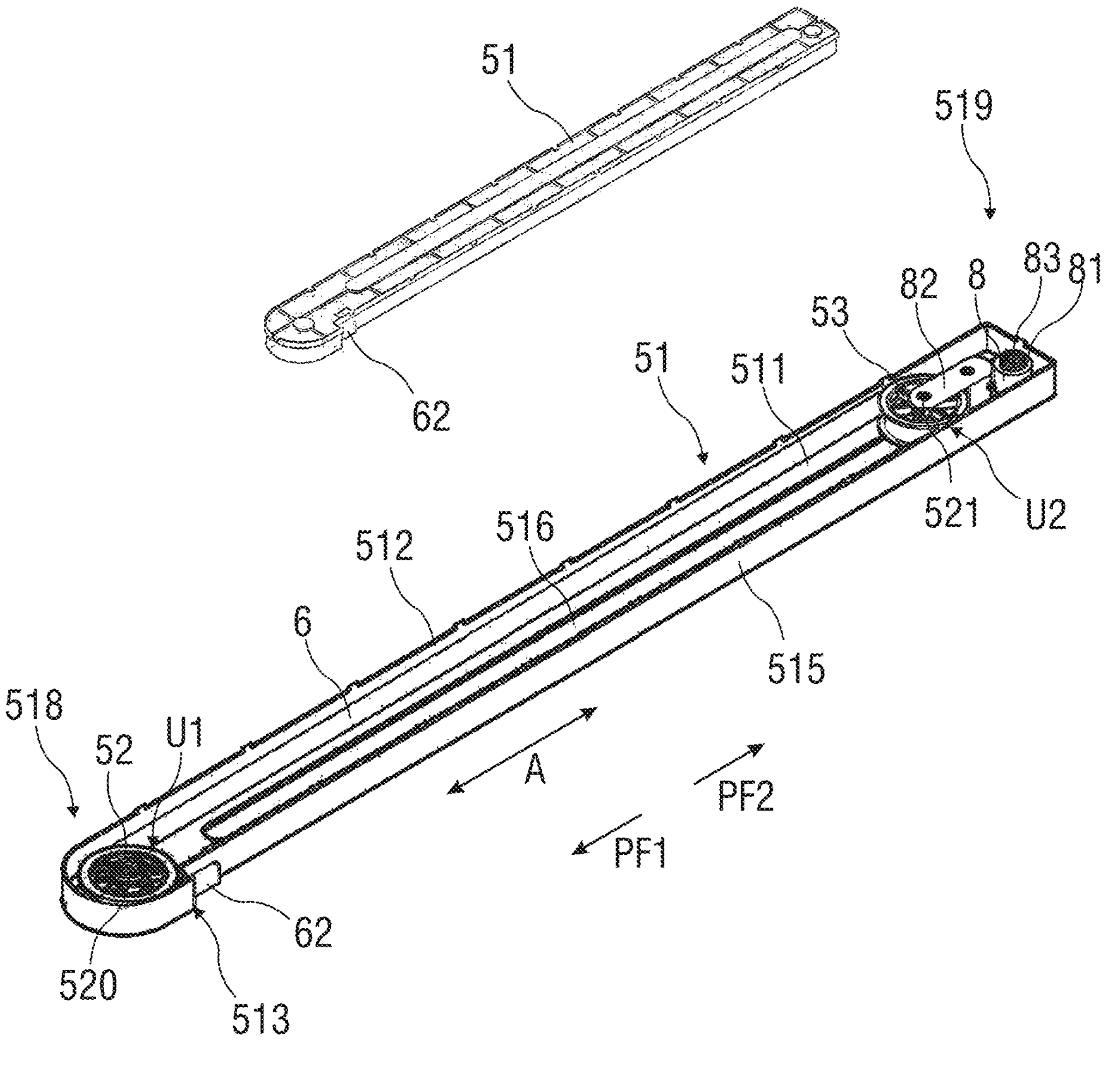

The cable deflecting apparatus 5 comprises for example a partially open or closed housing 51. The housing 51 has at least two walls 511, 512, as illustrated in FIGS. 3 to 5, which have through-openings 513 for the passage of the connecting cable 6. A first end 61 of the connecting cable 6 is connected to the power source and led out, for example, through a housing bottom 514. The housing bottom 514 is formed by a lower wall 511. A second end 62 of the connecting cable 6 is connected to the upper rail 31, in particular to the adjustment unit 4, and led out, for example, through a housing side 515. The housing side 515 is formed, for example, by a wall 512 running all the way around the housing bottom 514.

The deflecting rollers 52, 53 can be used to hold the connecting cable 6 under tension when the seat longitudinal adjustment device 1 is in operation and when it is not in operation. In this case, the connecting cable 6 is prevented from unintentionally rubbing against other components of the rail pair 3 or vehicle parts located in the structural space during a seat longitudinal adjustment.

By modifying a spacing A between the deflecting rollers 52, 53, the connecting cable 6 is lengthenable or shortenable. This means that the connecting cable 6 is always guided or guidable under tension in the rail profile 33 and in the cable deflecting apparatus 5, with the result that it is not possible for it to become slack or for an excess cable length to be produced. This makes it possible to securely guide the connecting cable 6 along with the upper rail 31.

Figure 2:
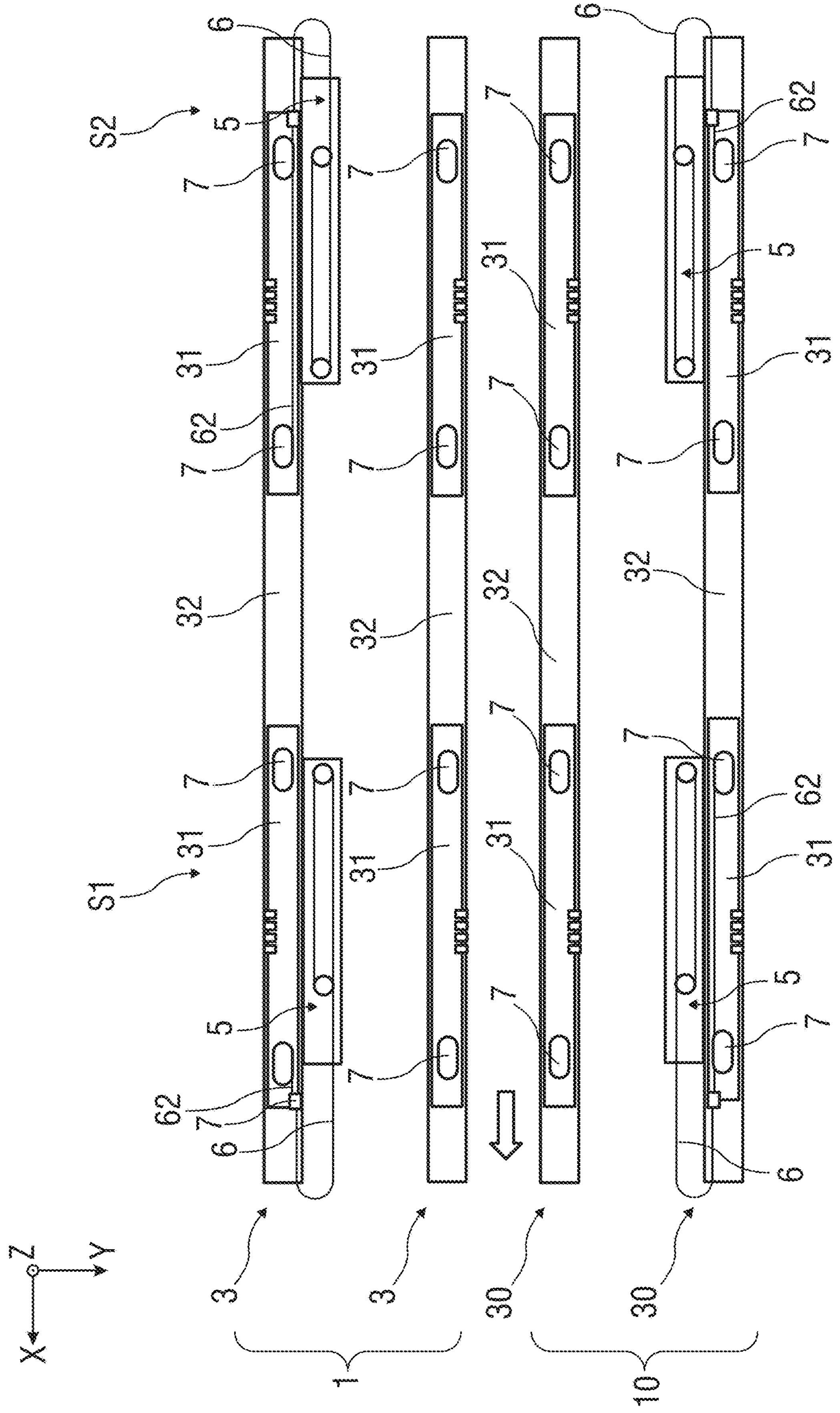

FIG. 2 schematically shows a plan view of a number of components of a seat longitudinal adjustment device 1, 10. FIG. 2 illustrates two seat longitudinal adjustment devices 1, 10 and four rail pairs 3, 30, a respective seat longitudinal adjustment device 1, 10 comprising two rail pairs 3, 30 at a spacing from one another. For example, the respective seat longitudinal adjustment device 1, 10 comprises an outer (outboard) rail pair 3, 30 and an inner (inboard) rail pair 3, 30. In the exemplary embodiment illustrated, the respective outer rail pair 3, 30 comprises a cable deflecting apparatus 5. The respective cable deflecting apparatus 5 is arranged on an inner side of the outer rail pair 3, 30. The respective cable deflecting apparatus 5 is accordingly arranged between two rail pairs 3, 30 of a seat longitudinal adjustment device 1, 10. The respective lower rail 32 is continuous for both seat rows S1, S2. Each upper rail 31 comprises a number of interfaces 7 for holding and/or connecting the corresponding end 62 of the connecting cable 6. In the case of the seat longitudinal adjustment device 1 illustrated at the top, the connecting cable 6 is coupled to an interface 7 arranged in the front region of the upper rail 31. In the case of the seat longitudinal adjustment device 10 illustrated at the bottom, the connecting cable 6 is coupled to an interface 7 arranged in the rear region of the upper rail 31.

FIG. 3 schematically shows a perspective view of one embodiment of a cable deflecting apparatus 5 for a seat longitudinal adjustment device 1, 10.

The respective cable deflecting apparatus 5 comprises two deflecting rollers 52, 53 arranged in the housing 51.

The deflecting roller 52 is in the form of a fixed roller. For example, the deflecting roller 52 is arranged fixed in position in the housing 51. The deflecting roller 53 is a roller which is movable relative to the fixed deflecting roller 52 and is movably arranged and guided in the housing 51. For this, the housing 51, in particular the housing bottom 514, has a roller guide 516, for example in the form of a guide groove. The movable deflecting roller 53 is axially spring-loaded. For example, the axially movable deflecting roller 53 is coupled to a spring element 8, for example a tension spring or compression spring. Moving the upper rail 31 causes the movable deflecting roller 53 to be carried along. The spring element 8, in particular in the form of a tension spring, attached to the movable deflecting roller 53 retracts the connecting cable 6 when the rail runner, i.e. the upper rail 31, moves in a first adjustment direction according to arrow PF1. The movable deflecting roller 53 is moved, in particular pulled, counter to a spring force of the spring element 8 when the rail runner, i.e. the upper rail 31, moves in an adjustment direction counter to the first adjustment direction, according to arrow PF2.

The roller guide 516 is arranged in the housing bottom 514. The roller guide 516 is, for example, a recess, indentation, clearance or groove formed in the housing bottom 514. The roller guide 516 may also be a separate guide element, for example a guide rail, which is fastened to the housing bottom 514. The roller guide 516 is, for example, a guide groove or a guide channel. The movable deflecting roller 53 has a bearing element 521 and/or a roller holder and/or a roller rail, which is guidedly held in the roller guide 516. The bearing element 521 is, for example, a bearing bolt or a bearing pin. In a refinement, the movable deflecting roller 53 is guidedly held in the roller guide 516 by means of a rail guide. The rail guide is arranged, for example, on a lower side of the bearing element 521.

In the exemplary embodiment illustrated, the connecting cable 6 is deflected in and/or along by three deflection regions U1 to U3. The deflection regions U1 and U2 are predefined by the deflecting rollers 52, 53. A third deflection region U3 is formed by a deflecting guide 517 formed at the end of the housing 51.

The housing 51 has two housing ends 518, 519. A bearing element 520, to which the positionally fixed deflecting roller 52 is fastened, is arranged at one housing end 518. The movable deflecting roller 53 is arranged in the region of the housing end 519 situated opposite the housing end 518. The movable deflecting roller 53 is axially movable, for example, relative to the positionally fixed deflecting roller 52. The bearing element 520 is, for example, a bearing bolt connected to the housing 51 or a bearing pin. The bearing element 520 is fixed, for example fastened by a material bond, a force-fit and/or a form-fit, for example to the housing end 518, in particular to the wall 511 or to the housing bottom 514.

The deflecting guide 517 may be in the form of a further deflecting roller. The deflecting guide 517 may be designed in the form of a semicircle and/or be C shaped or U shaped. The deflecting guide 517 is, for example, a separate or integrated guide element, which is fastened to the wall 511 or to the housing bottom 514. For example, the deflecting guide 517 is arranged at the housing end 519. The deflecting guide 517 is connected to the housing 51 by a material bond, a force-fit and/or a form-fit and is positionally fixed, in particular positionally secured, for example immovable.

The movable deflecting roller 53 is arranged so as to be movably guided between the deflecting guide 517 and the positionally fixed deflecting roller 52. The spring element 8 for biasing the movable deflecting roller 53 is fastened to the deflecting guide 517 by way of one spring end 81 and to the movable deflecting roller 53 by way of another spring end 82.

The deflection of the connecting cable 6 is configured such that a cable portion inserted in the housing interior space from the power source through the through-opening 513 in the housing bottom 514 is guided, in particular deflected, around the movable deflecting roller 53, then around the positionally fixed deflecting roller 52 and then around the deflecting guide 517 out of the through-opening 513 in the housing side 515.

FIG. 4 and FIG. 5 each schematically show a perspective view of another embodiment of a cable deflecting apparatus 5 for a seat longitudinal adjustment device 1, 10.

The respective cable deflecting apparatus 5 comprises two deflecting rollers 52, 53 arranged in the housing 51.

The deflecting roller 52 is in the form of a fixed roller. For example, the deflecting roller 52 is arranged fixed in position in the housing 51. The deflecting roller 53 is a roller which is movable relative to the fixed deflecting roller 52 and is movably arranged and guided in the housing 51. For this, the housing 51, in particular the housing bottom 514, has a roller guide 516, for example in the form of a guide groove. The movable deflecting roller 53 is axially spring-loaded. For example, the axially movable deflecting roller 53 is coupled to a spring element 8, for example a tension spring (FIG. 4) or a roller spring (FIG. 5). Moving the upper rail 31 causes the movable deflecting roller 53 to be carried along. The spring element 8, in particular in the form of a tension spring (FIG. 4) or a roller spring (FIG. 5), attached to the movable deflecting roller 53 retracts the connecting cable 6 when the rail runner, i.e. the upper rail 31, moves in a first adjustment direction according to arrow PF1. The movable deflecting roller 53 is moved, in particular pulled, counter to a spring force of the spring element 8 when the rail runner, i.e. the upper rail 31, moves in an adjustment direction counter to the first adjustment direction, according to arrow PF2.

In the exemplary embodiment illustrated, the connecting cable 6 is deflected in and/or along by two deflection regions U1 and U2. The deflection regions U1 and U2 are predefined by the deflecting rollers 52, 53.

The deflection of the connecting cable 6 is configured such that a cable portion inserted in the housing interior space from the power source through the through-opening 513 in the housing bottom 514 is guided, in particular deflected, around the movable deflecting roller 53 and then around the positionally fixed deflecting roller 52 out of the through-opening 513 in the housing side 515.

The spring element 8 is fastened to one housing end 519 of the housing 51. For example, one spring end 82 of the spring element 8 is connected to the movable deflecting roller 53. Another spring end 81 is connected to the housing end 519, in particular to the wall 512.

In another embodiment, the spring element 8 is in the form of a roller spring. The spring element 8 in the form of a roller spring is coilable around a winding roller 83. The winding roller 83 is fastened, for example, to the housing end 519 of the housing 51. One spring end 81 of the spring element 8 is fastened to the winding roller 83 and another spring end 82 of the spring element 8 is connected to the movable deflecting roller 53.

Figure 6:
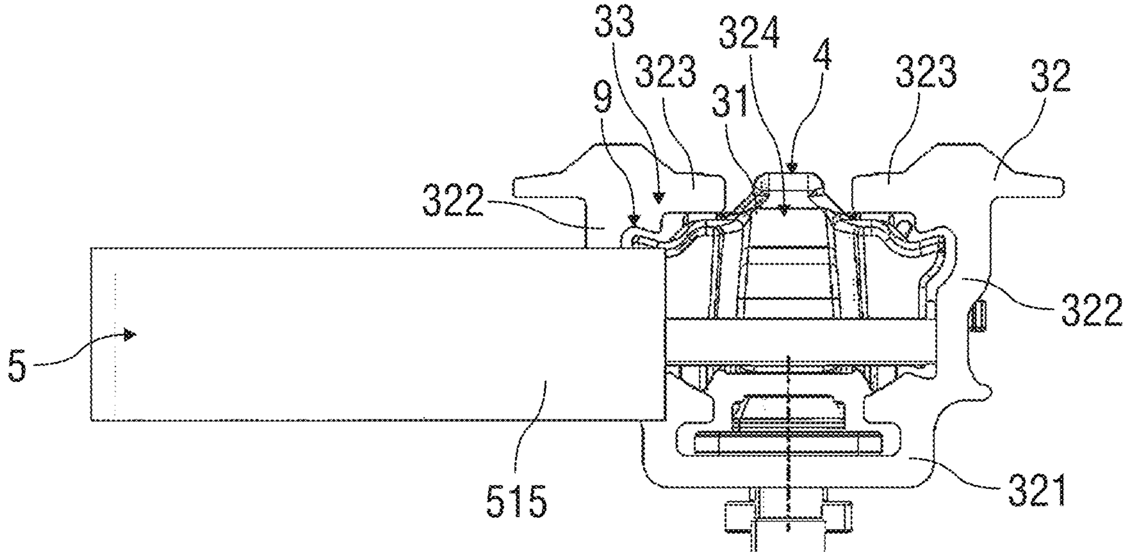

FIG. 6 schematically shows a sectional illustration through a rail pair 3 of the seat longitudinal adjustment device 1.

The stationary lower rail 32 has a substantially U-shaped cross section, the lower rail 32 comprising a bottom wall 321, also referred to as rail bottom, and two side walls 322. The side walls 322 point upward from the bottom wall 321 and extend parallel to each other. Ends 323 of the side walls 322 point, in particular are bent, inward and each forms an upper support wall. The ends 323 are arranged substantially parallel to the bottom wall 321. A free space, for example a leg area, is formed between the ends 323 for the passage of a seat attachment fastened to the upper rail 31. In the exemplary embodiment illustrated, the cable deflecting apparatus 5 is fastened to the side wall 322. As an alternative or optional addition, the cable deflecting apparatus 5 may be fastened to a vehicle floor. At least one of the side walls 322 of the lower rail 32 comprises a receiving profile 9 for receiving and guiding the connecting cable 6 or cable bundle or cable housing along the longitudinal extent of the rail pair 3, 30. The through-opening 513 formed in the housing side 515 is substantially in line with a rail opening 324 of the rail pair 3, 30, in particular the lower rail 32. The end 62, in particular cable end, led out of the cable deflecting apparatus 5 is led through the rail opening 324 into the receiving profile 9.

Figure 7:
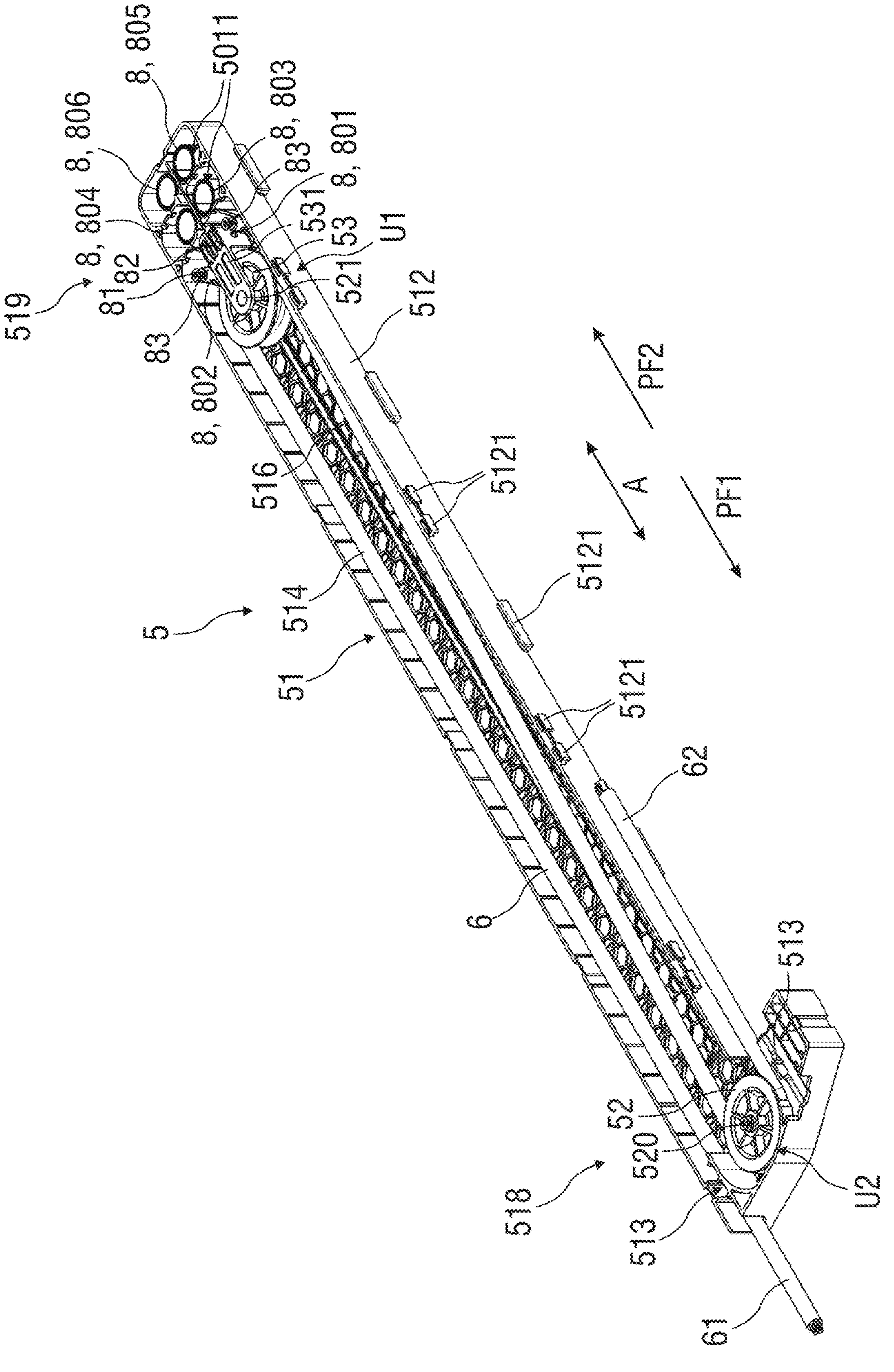

FIG. 7 schematically shows a perspective view of another embodiment of a cable deflecting apparatus 5 for a seat longitudinal adjustment device 1, 10.

The respective cable deflecting apparatus 5 comprises two deflecting rollers 52, 53 arranged in the housing 51.

The deflecting roller 52 is in the form of a fixed roller. The deflecting roller 53 is a roller which is movable relative to the fixed deflecting roller 52 and is movably arranged and guided in the housing 51. For this, the housing 51, in particular the housing bottom 514, has a roller guide 516, for example in the form of a guide groove. The movable deflecting roller 53 is axially spring-loaded. For example, the axially movable deflecting roller 53 is coupled to a spring element 8 or multiple spring elements 8. Moving the upper rail 31 causes the movable deflecting roller 53 to be carried along. A distribution of force is improved by the use of multiple spring elements 8.

The spring elements 8 are each in the form of roller springs 801 to 806. This makes it possible to save on space and to make the cable deflecting apparatus 5, in particular the cable cassette 5, compact. For example, two spring elements 8, in particular roller springs 801, 802, may be provided. The two spring elements 8 are arranged parallel to and next to one another. For example, the roller springs 801, 802 are arranged parallel to one another in the longitudinal direction X and next to one another transversely to the longitudinal direction X. An offset arrangement, for example in the longitudinal direction X, can likewise be conceivable. In a refinement, three spring elements 8, four spring elements 8, five spring elements 8 or, as illustrated, six spring elements 8 or further spring elements 8 may be provided.

For example, the housing 51 may have individual housing chambers 5011 separated from one another by a wall. Each housing chamber 5011 may receive a spring element 8. This avoids the spring elements 8 unintentionally coming into contact. The spring elements 8 are likewise protected against dirt or other external influences. Each housing chamber 5011 is connected to a housing space, in which the deflecting rollers 52, 53 are arranged, such that the respective spring end 82, which is connected to the movable deflecting roller 53, can be led out of the respective housing chamber 5011.

The connecting cable 6 or the cable bundle is laid over the two deflecting rollers 52, 53 substantially in an S shape. The connecting cable 6 or the cable bundle is inserted in the housing 51 and led out for connection to the seat longitudinal adjustment device 1, 10 at the same housing end 518. The cable ends 61, 62 extend substantially parallel to one another in the longitudinal direction X. The housing end 518 comprises two through-openings 513 for the passage of the cable ends 61, 62.

The spring element 8 or the spring elements 8 is/are arranged at a housing end 519 situated opposite the housing end 518 intended for insertion and leading-out of the connecting cable 6 or cable bundle. The respective spring element 8, in particular the respective roller spring 801 to 806, can be coilable around a winding roller 83. One spring end 81 of the respective spring element 8 is fastened to the winding roller 83 and another spring end 82 of the respective spring element 8 is directly or indirectly connected to the movable deflecting roller 53.

The connecting cable 6 is inserted into the housing space through the first through-opening 513. The connecting cable 6 extends from the housing end 518 toward the movable deflecting roller 53, which forms a first deflection region U1 for the connecting cable 6. The connecting cable 6 is deflected in the first deflection region U1 and directed or guided back to the housing end 518 and thus to the fixed deflecting roller 52. The fixed deflecting roller 52 forms a second deflection region U2. At the second deflection region U2, the connecting cable 6 is deflected and guided out of the through opening 513 for connection to the seat adjustment device 1, 10.

The movable deflecting roller 53 is connected to the spring element 8 or the spring elements 8 via a roller holder 531. In an end position, illustrated in FIG. 7, of the movable deflecting roller 53, the deflecting roller 53 and/or the roller holder 531 and at least one of the spring elements 8 are arranged next to one another. In the embodiment illustrated, the deflecting roller 53 and/or the roller holder 531 is positioned between two spring elements 8. As a result, a compact design of the cassette can be enabled.

The spring element 8, in particular the roller spring 801, or the spring elements 8, in particular the roller springs 801 to 806, retracts/retract the connecting cable 6 when the rail runner, i.e. the upper rail 31, moves in a first adjustment direction according to arrow PF1. The movable deflecting roller 53 is moved, in particular pulled, counter to a spring force of the spring element 8 or the spring elements 8 when the rail runner, i.e. the upper rail 31, moves in an adjustment direction counter to the first adjustment direction, according to arrow PF2.

The roller guide 516 is arranged in the housing bottom 514. The roller guide 516 is, for example, a recess, indentation, clearance or groove formed in the housing bottom 514. The roller guide 516 may also be a separate guide element, for example a guide rail, which is fastened to the housing bottom 514. The roller guide 516 is, for example, a guide groove or a guide channel. The movable deflecting roller 53 has a bearing element 521, which is guidedly held in the roller guide 516. For example, the bearing element 521 is connected to the roller holder 531. The roller holder 531 may be in the form of a rail or carriage. The bearing element 521 is, for example, a bearing bolt or a bearing pin. In a refinement, the movable deflecting roller 53 is guidedly held in the roller guide 516 by means of a rail guide. The rail guide is arranged, for example, on a lower side of the bearing element 521.

The housing 51 has two housing ends 518, 519. A bearing element 520, to which the positionally fixed deflecting roller 52 is fastened, is arranged at one housing end 518. The movable deflecting roller 53 is arranged in the region of the housing end 519 situated opposite the housing end 518. The movable deflecting roller 53 is axially movable, for example, relative to the positionally fixed deflecting roller 52. The bearing element 520 is, for example, a bearing bolt connected to the housing 51 or a bearing pin. The bearing element 520 is fixed, for example fastened by a material bond, a force-fit and/or a form-fit, for example to the housing end 518, in particular to the wall 511 or to the housing bottom 514.

A wall 512 of the housing 51 may have a plurality of latching elements 5121, which can come into engagement with counter latching elements, not illustrated in more detail, of the rail pair 3, 30. For example, the latching elements 5121 and counter latching elements may be in the form of corresponding latching lugs or latching hooks and latching openings or latching grooves.

LIST OF REFERENCE SIGNS

1, 10 Seat longitudinal adjustment device
2 Vehicle seat
3, 30 Rail pair
31 Rail, in particular upper rail
32 Rail, in particular lower rail
321 Bottom wall
322 Side wall
323 End
324 Rail opening
33 Rail profile
4 Adjustment unit
5 Cable deflecting apparatus, in particular cable cassette
51 Housing
511,512 Wall
5121 Latching element
513 Through-opening
514 Housing bottom
515 Housing side
516 Roller guide
517 Deflecting guide
518, 519 Housing end
520 Bearing element
521 Bearing element
52, 53 Deflecting roller
531 Roller holder
5011 Housing chamber
6 Connecting cable
61,62 End
7 Interface
8 Spring element
81, 82 Spring end
83 Winding roller
801 to 806 Roller spring
9 Receiving profile
11 Power supply unit
20 Safety component
A Spacing
B Seat attachment element
KL Cable length
PF1, PF2 Arrow
SA Seat arrangement
S1, S2 Seat row
U1 bis U3 Deflection region
X Longitudinal direction
Y Transverse direction
Z Vertical direction

The invention claimed is:

1. A cable cassette for a seat longitudinal adjustment device, comprising: at least one housing and two rotatably mounted deflecting rollers, at least one being a stationary deflecting roller and at least one being a movable deflecting roller, which are arranged in the housing and form a respective deflection region for deflecting a connecting cable or cable bundle, one of the movable deflecting rollers being held in longitudinally movably guided fashion in the housing relative to the stationary deflecting roller, and a first free end of the connecting cable or of the cable bundle being held fixed in position via a first cassette outlet and the connecting cable or the cable bundle being guided and deflected around the movable deflecting roller and guided from the movable deflecting roller to the stationary deflecting roller and deflected around this stationary deflecting roller, and a second free end of the connecting cable or of the cable bundle being movably mounted, the housing comprising a deflecting guide, which forms a further deflection region for deflecting the connecting cable or the cable bundle, wherein the movable deflecting roller is arranged so as to be movably guided between the deflecting guide and the positionally fixed deflecting roller.

2. The cable cassette as claimed in claim 1, further comprising at least one spring element being provided in the housing and the movable deflecting roller being held under bias in the housing via the at least one spring element, the at least one spring element being in the form of a roller spring, and at least one of the spring elements being coupled to the movable deflecting roller.

3. The cable cassette as claimed in claim 2, wherein at least two spring elements are provided, wherein, in the case of two spring elements, the spring elements are arranged parallel to one another or next to one another.

4. The cable cassette as claimed in claim 2, wherein at least one spring element is arranged at a housing end and is adapted for insertion and leading-out of the connecting cable or cable bundle.

5. The cable cassette as claimed in claim 2, wherein the movable deflecting roller is connected to the at least one spring element via a roller holder.

6. The cable cassette as claimed in claim 5, wherein at least two spring elements are provided, wherein the roller holder or the movable deflecting roller and at least one of the spring elements are arranged next to one another in an end position of the movable deflecting roller.

7. The cable cassette as claimed in claim 1, wherein the connecting cable or the cable bundle is laid over the two deflecting rollers substantially in an S shape.

8. The cable cassette as claimed in claim 1, wherein the connecting cable or the cable bundle is inserted in the housing and led out for connection to the seat longitudinal adjustment device at the same housing end.

9. The cable cassette as claimed in claim 1, wherein the housing has a roller guide in which the movable deflecting roller or a roller holder is guidedly held.

10. The cable cassette as claimed in claim 1, wherein the housing at one housing end has a bearing element, on which the deflecting roller is held fixed in position.

11. The cable cassette as claimed in claim 1, the housing has at least two walls, which have through-openings for the passage of the connecting cable or of the cable bundle.

12. A seat longitudinal adjustment device for a vehicle seat, comprising:

a cable cassette as claimed in claim 1, a rail pair having at least two rails that are movable relative to one another, and a connecting cable or cable bundle, which connects the rail pair to a power supply unit and is arranged partially in the cable cassette and partially in a rail profile of the rail pair, and, depending on an adjustment of the rails of the rail pair, a cable length of the connecting cable or of the cable bundle, in particular inside the rail profile or the cable cassette, is modifiable.

13. The seat longitudinal adjustment device as claimed in claim 12, wherein the cable cassette extends parallel to the longitudinal direction of the rail pair.

* * * * *